United States Patent [19]

Scheffel

[11] 3,935,431
[45] Jan. 27, 1976

[54] APPARATUS FOR THE STORAGE AND READING OF DATA COMBINED FROM BINARY NUMBERS

[75] Inventor: Kurt Scheffel, Weil am Rhein, Germany

[73] Assignee: The Grey Lab. Establishment, Vaduz, Liechtenstein

[22] Filed: Dec. 16, 1974

[21] Appl. No.: 533,128

[30] Foreign Application Priority Data
Dec. 28, 1973 Switzerland............... 18218/73

[52] U.S. Cl. ........ 235/61.11 A; 235/11 E; 235/12 C
[51] Int. Cl.² ............... G06K 7/06; G06K 19/06
[58] Field of Search ............ 235/61.11 D, 61.11 E, 235/61.11 R, 61.12 M, 61.12 N, 61.12 R, 235/61.7 B, 61.11 A; 340/174 CB, 174 QA, 340/173 LM; 250/268, 269, 270

[56] References Cited
UNITED STATES PATENTS

| | | | |
|---|---|---|---|
| 3,092,813 | 6/1963 | Broadbent | 340/174 CB |
| 3,215,819 | 11/1965 | Smith | 235/61.11 E |
| 3,564,214 | 2/1971 | Cooper | 235/61.11 D |
| 3,678,251 | 7/1972 | Delpino | 235/61.11 A |
| 3,754,988 | 8/1973 | Barnes | 340/173 LM |
| 3,793,600 | 2/1974 | Grosbard | 235/61.12 N |

Primary Examiner—Daryl W. Cook
Assistant Examiner—Robert M. Kilgore
Attorney, Agent, or Firm—Gordon W. Hueschen

[57] ABSTRACT

An apparatus for the storage and reading of data combined from binary characters, comprising a data carrier having adjacently arranged separate signal conductor tracks incorporating intermediate spaces extending along the columns and separating the conductor tracks, bridge elements provided for the data carrier for the one binary character in the intermediate spaces between the conductor tracks at predetermined intersection points of the columns and lines. The bridge elements interconnecting at the intersection points both of the conductor tracks of a relevant column with one another. The bridge elements are reversibly activatable from a first condition which can be detected via the conductor tracks of the columns through an external action into a second condition portraying a binary character and detectable via the conductor tracks, and for the other binary character the conductor tracks at the relevant other intersection points of the columns and lines are selectively either not interconnected with one another or interconnected by such bridge elements. Means are provided for rendering ineffectual from the outside the external action of such other bridge elements for retaining the same permanently in the first condition portraying this other binary character. A reader is provided having means for generating the action in a region corresponding to a line of the data carrier, a feed mechanism for moving relative to one another the data carrier and the means generating the action in order to bring about a line-by-line scanning of the data carrier, an evaluation device, and a detector operatively connected with the evaluation device for producing output signals for the evaluation device for determining the state of the bridge elements of the data carrier via its conductor tracks. The detector including a control device for the columnwise connection of pairs of conductor tracks determining the individual columns, said detector being designed such that its output signals in the case of bridge elements activated by the external action and connected therewith via a pair of conductor tracks possesses a first signal value portraying the one binary character and otherwise a second signal value portraying the other binary character.

29 Claims, 11 Drawing Figures

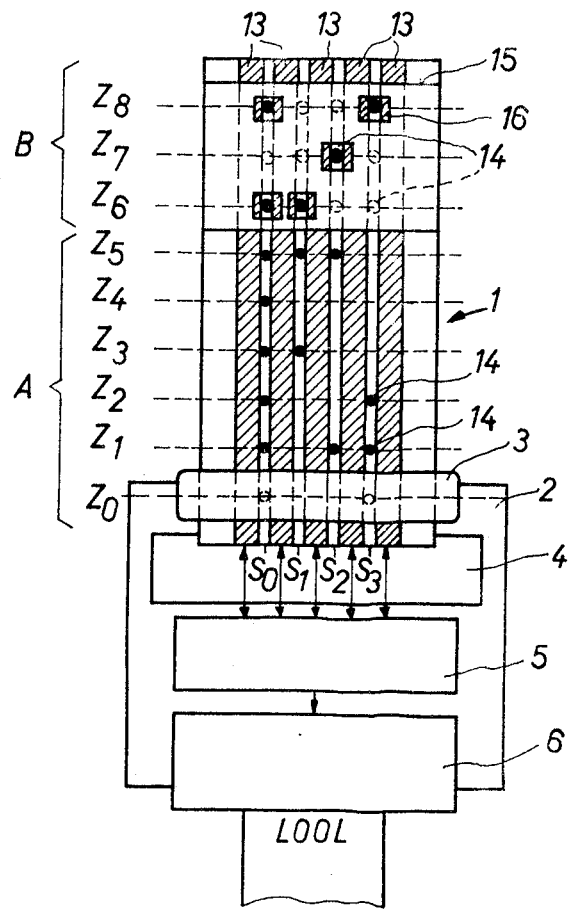
Fig.1
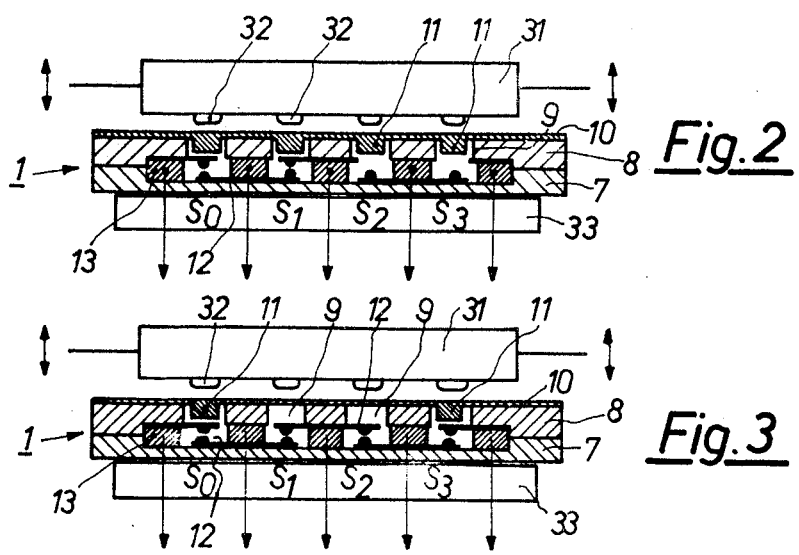
Fig.2
Fig.3

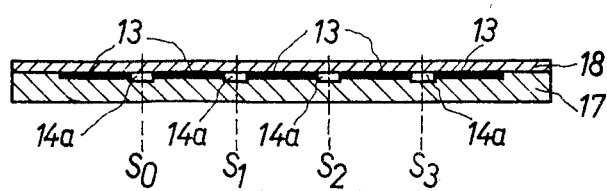
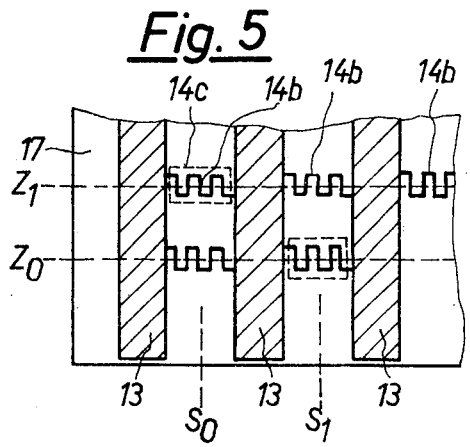
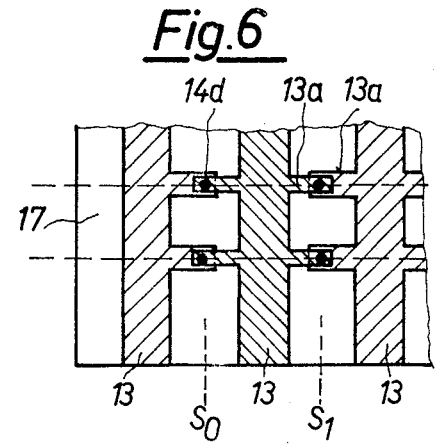
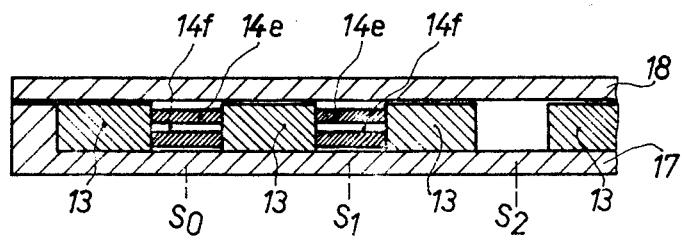
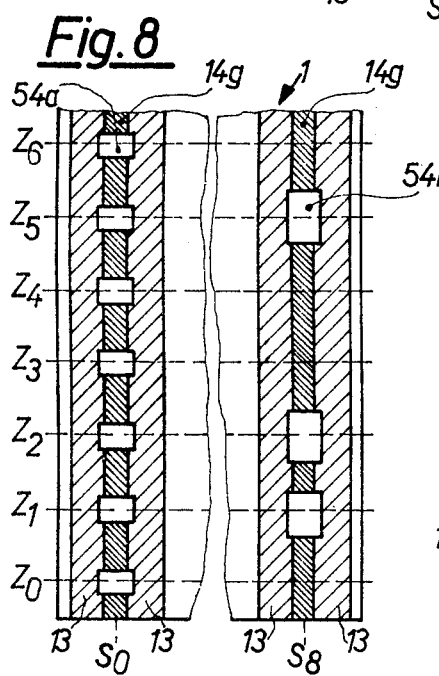
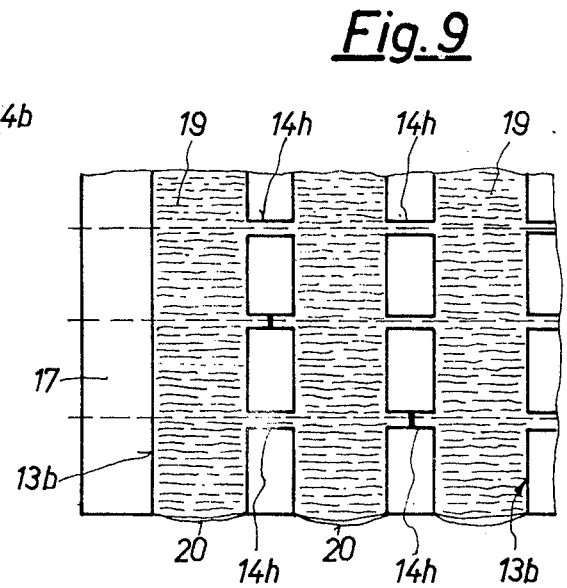

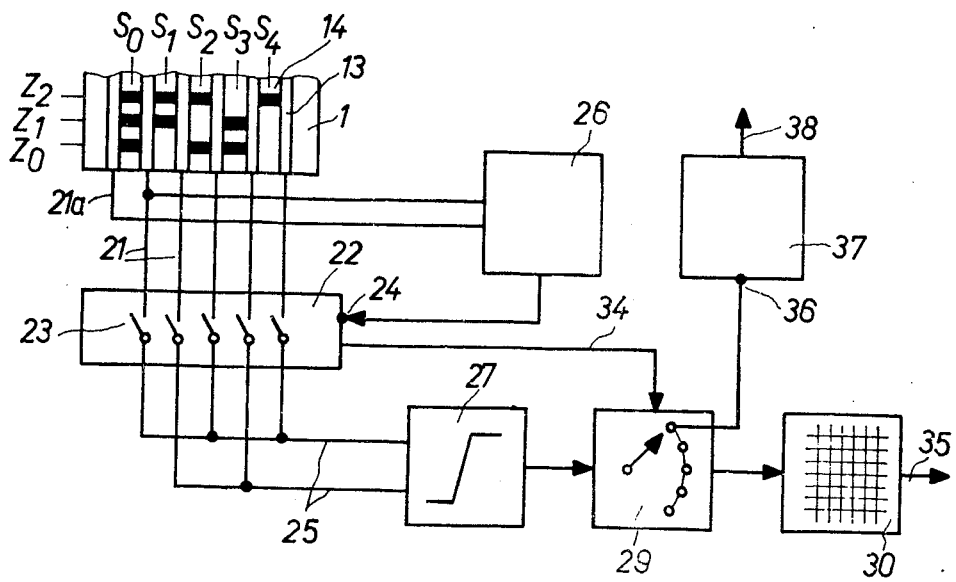
_Fig.10_
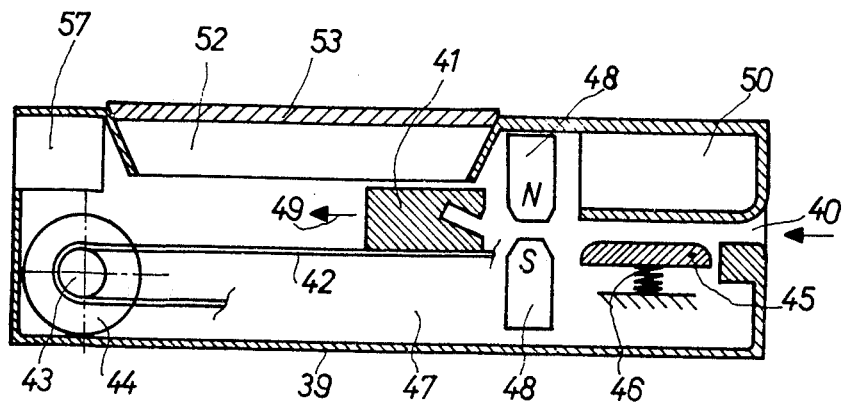
_Fig.11_

APPARATUS FOR THE STORAGE AND READING OF DATA COMBINED FROM BINARY NUMBERS

BACKGROUND OF THE INVENTION

The present invention relates to an apparatus for the storage and reading of data combined from binary numbers, incorporating a data carrier as storage, especially in the form of a card, which possesses at crossover or intersection points of lines and columns means for portraying the binary characters by binary signal values, and a reader for the data carrier which is constructed for generating binary signals portraying the stored data by a line-by-line sampling of the data carrier and evaluation of the binary signals.

Data carriers in the form of cards are used for different purposes, for instance for programming small computers, controlling machines, as identification for individuals and so forth. The data carriers are generally constructed for a mechanical, magnetic or optical scanning or sampling. Mechanically scannable data carrier-cards are provided with recesses, cam-shaped raised portions or perforations for the application of the binary data, by means of which there can be actuated electrical contacts in the reader during the scanning operation. Most frequently there are used the generally known perforated or punched cards. Such perforated cards also can be optically scanned, wherein a bundle of light rays directed upon a photoelectric transducer is either unobstructed or interrupted by the perforated card. In the case of other optically scannable data carriers there are used for the portrayal of the binary characters light absorbing and light reflecting markers, also fluorescent markers which illuminate upon being radiated with ultraviolet rays. The mechanical scannable data carrier and most of the optically scannable data carriers can be read without readers or other auxiliary aids. The magnetic scannable data carriers in card form possess a magnetic layer which is appropriately magnetized in the one or other magnetization direction at the intersection points of the lines and columns of the binary characters. The writing and reading of the data occurs by means of magnetic heads.

For some special applications the prior art devices with card-shaped data carrier and associated reader are unsatisfactory. If, for instance, the data carrier should serve as identification or code, then it has been found that the generally advantageous simple constructions in these special situations is particularly disadvantageous, since for instance reproductions and falsifications can be undertaken without any great difficulties, and without there being able to be ascertained or detected at the original data carrier that copying has been undertaken. Also a change of the applied data with the known data carriers is either too simple or too cumbersome: it is too simple when the change of the applied data for falsification purposes is undertaken by an unauthorized person, and too cumbersome when the data carrier, apart from containing fixed data, also should contain flexible data which must be changed from time to time.

SUMMARY OF THE INVENTION

It is therefore an object of the invention to provide an apparatus for the storage and reading of binary portrayed data with a data carrier, especially in card form, and a reader by means of which the data applied to the data carrier cannot be readily recognized and the data carrier can accommodate both fixed data as well as also flexible or variable data, and wherein the fixed data is safeguarded against manipulations by unauthorized personnel and changes of the flexible data can be carried out with a minimum of effort and expenditure.

The apparatus, data carrier and reader, according to a further object of the invention, additionally should be fabricated economically and at least not be considerably more expensive than known equipment of this type.

The solution of these objectives, as contemplated by the invention, resides in the fact that the data carrier contains adjacently arranged, separate conductor tracks with intermediate spaces extending along the columns and separating the conductor tracks. In the data carrier for the one binary character there is provided bridge elements in the intermediate spaces between the conductor tracks at the corresponding intersection points of the columns and lines. The bridge elements at the intersection points in each case connect with one another both of the conductor tracks of the relevant column. The first condition detectable from one of the columns via the conductor tracks is reversibly activatable through an external influence or action into a second condition or state portraying a binary character and detectable via the conductor tracks, and for the other binary character the conductor tracks at the corresponding other cross-over points of the columns and lines are not connected or else through such bridge elements, which however by the agency of means rendered ineffectual to the external action and are permanently maintained in the first state portraying this other binary character. Further, the reader contains means for producing the influence or action at a region corresponding to a line of the data carrier, a feed mechanism in order to move relative to one another the data carrier and the means producing the action to enable a line-by-line sampling or scanning of the data carrier. Further, there is provided a detector device for producing an output signal for an evaluation device for detecting the state of the bridge elements of the data carrier via its conductor tracks with a control device for the columnwise connection of the pair of conductor tracks determining the individual columns. The detector device is designed such that its output signal, with a bridge element activated by the action, by means of a pair of conductor tracks connected therewith, possesses a first signal value portraying the one binary character and the remaining time a second signal value portraying the other binary character.

The data carrier can possess a section encompassing one or more lines for the application of fixed data and a section encompassing one or more lines for the flexible data, wherein in each instance for the portrayal of the one binary character, for instance the logic value "1" there is employed a bridge element which can be activated by the influence or action and for the portrayal of the other binary character, for instance the logic value "0" for the flexible value there is used a bridge element having means for rendering ineffectual the action, for instance a screen, and for the fixed data there is used an intentionally destroyed bridge element or even no bridge element. During fabrication it can be advantageous to provide the data carrier at all crossover points or intersections of the columns and lines with bridge elements and then in sections for the fixed data at the cross-over points, at which there should appear the binary character 0, to destroy the bridge elements or completely remove the same, and in the section for the flexible data to provide a "screen" rendering ineffectual the action and located at the crossover points, the screen having "windows" at which there should appear the binary character 1, and which can be easily exchanged. The data carrier also can be provided with a nontransparent cover layer which covers the conductor tracks and the bridge elements as well as the screen, which however does not considerably impair the influence or action, so that the construction of the data carrier is not visible from the outside without damaging the same, and there also cannot be ascertained the methods or techniques used for the reading operation.

The bridge elements can be electrical elements, which under an external influence or action, such as pressure, tension, magnetic or electrical field, light and so forth, change their resistance or their conductivity respectively, or produce an electromagnetic force. The conductor tracks then can be galvanic conductors which are practically insensitive to the influence or action, however also other constructions are possible, such as pneumatic.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic illustration of an apparatus for the storage and reading of binary data with a data carrier containing conductor tracks and bridge elements and a reading device or reader according to the invention, and in which illustration the principle construction of the apparatus is visible;

FIG. 2 is a section taken along the line of a data carrier with mechanically actuatable contact pairs as bridge elements for the fixed data of the data carrier;

FIG. 3 is a section along a line for flexible data taken through the data carrier of FIG. 2;

FIG. 4 schematically illustrates a section through a line of a data carrier equipped with field sensitive electrical components as bridge elements;

FIG. 5 schematically illustrates in plan view a portion of a data carrier equipped with inductances as bridge elements;

FIG. 6 schematically illustrates in plan view a portion of a data carrier equipped with thermoelements as bridge elements;

FIG. 7 schematically illustrates in sectional view a data carrier with temperature sensitive resistors;

FIG. 8 is a plan view of two columns of a data carrier with continuous bridges between the conductor tracks;

FIG. 9 schematically illustrates in plan view a part of a data carrier with pneumatic bridge elements;

FIG. 10 is a block circuit diagram of an advantageous embodiment of a detector device of an apparatus with electrically scanned bridge elements in the data carrier; and FIG. 11 is a sectional view of a reader for the data carrier.

DETAILED DESCRIPTION OF THE PREFERRED EMBODIMENTS

Describing now the drawings, FIG. 1 illustrates in schematic view the principle construction of an apparatus for the storage and reading of binary portrayed data according to the invention. The apparatus encompasses the data carrier 1 and the reader 2.

Although different embodiments are possible, the data carrier 1, as shown in FIG. 1, has the form of a rectangular card. The data carrier 1 contains a number of conductor tracks or paths 13 parallel to the lengthwise edges of the card, and such conductor tracks, for instance, can be galvanic conductors for conducting electrical currents. As for instance is conventional with perforated or punched cards there are provided on the card lines, in FIG. 1, the lines $Z_0 \ldots Z_8$, and columns, in FIG. 1, the columns $S_0 \ldots S_3$. The columns $S_0 \ldots S_3$ are associated with the intermediate spaces of the conductor tracks 13, so that each column is defined by a pair of conductor tracks 13. The data carrier 1 depicted in FIG. 1 accordingly contains five conductor tracks 13 and at each line $Z_0 \ldots Z_8$ there can be stored a four bit word. The binary characters 0 and 1 to be arranged at the cross-over or intersection points of the lines and columns are realized by means of bridge elements 14. The conductor tracks 13 and the bridge elements 14 should satisfy the following requirements: the bridge elements 14, in accordance with a given parameter detectable via the conductor tracks 13, through an external action should be reversibly so changeable that the parameter value (a condition or state) of an element with sufficiently pronounced action is still distinguishable from the multiplicity of the parameter corresponding to the number of lines without the action and the influence of the action upon the conductor tracks 13 during the detection of the parameter value is negligibly low. The nature of the bridge elements, the influence or action, the conductor tracks and the means for the detection of the parameter values are independent of one another and in any event must be appropriately selected. There are a multiplicity of suitable combinations, some of which will be considered more fully hereinafter. Initially, for the explanation of the apparatus portrayed in FIG. 1 there has been given, purely by way of example, one such combination, to wit: the bridge elements 14 can be photoresistors, the ohmic resistance or conductivity (parameter) of which changes with the illumination intensity (action or influence). The resistance (parameter) of the photoresistors as concerns their magnitude is detected by a current measurement, wherein the conductor tracks 13, for instance, are copper conductors, the conductivity of which for the electrical current is practically independent of the illumination.

The bridge elements 14 are provided in the data carrier 1 at the cross-over points or intersections of the lines and columns as the connections of neighboring conductor tracks 13.

The data carrier 1 shown in FIG. 1 possesses a first section A with the lines $Z_0 \ldots Z_5$ and a second section B with the lines $Z_6$, $Z_7$ and $Z_8$. The section A encompasses the fixed data of the data carrier and the section B the flexible data. At all intersection points of the lines and columns at which the data to be stored should correspond to the one binary character, for instance the binary character 1, there is inserted an element 14. In the section A for the fixed data there are not present such bridge elements 14 at all remaining cross-over points, i.e. at the cross-over or intersection points of the lines and columns at which there is to appear the data to be stored according to the other binary character, in this case the binary value 0, and both conductor tracks 13 of the relevant columns are separated from one another at the region of the individual lines. In the section B for the flexible data, on the other hand, there is also present at each cross-over or intersection point for the binary character 0 one such bridge element 14, which, however, is equipped with means 15 which prevents an influence of the action upon the bridge element. In the case of photoresistors as the bridge elements the means 15 preventing the action or influence consists, for instance, of a light impervious layer which covers the entire section B of the data carrier and at the region of those bridge elements 14 which are exposed to the action for the portrayal of the binary character 1, possess windows 16. These means 15 which prevent the action or influence are constructed to be easily exchangeable, so that the flexible data can be changed with ease. Due to the arrangement of the photoresistors in the section A there are thus determined the fixed data and due to the arrangement of the windows 16 in the screen or mask 15 there is determined the flexible data. Advantageously there are employed first of all at all cross-over points of the columns or lines bridge elements 14 and then for the writing-in of the data in the section A of a data carrier 1 the elements 14 are removed from the cross-over points having the binary character 0 or the bridge elements at such cross-over points destroyed.

For reading the data the data carrier 1 is subjected line-by-line to the action in the reader or reader device 2. The reader 2 contains means 3 for producing the action or influence and constructed such that the action is limited to a region corresponding to a line of the data carrier 1. If the bridge elements 14 are photoresistors, then the means producing the action or influence can consist of a light source which illuminates a band corresponding to a line of a data carrier 1. In order to expose the data carrier 1 to the action line-by-line there is provided in the reader 2 a feed mechanism 4 by means of which the data carrier 1 is preferably moved stepwise relative to the means 3 producing the influence or action. A line is always then read when it is exposed to such action. The reading occurs by means of a detector 5 which is constructed in accordance with the technique prescribed for the detection of the bridge element parameter. With the selected exemplary embodiment with photoresistors as the bridge elements 14, as already previously mentioned, there is provided, for instance, a current measurement. The detector 5 then contains, for instance, a direct-current source and a current measuring device, which is constructed as a threshold value device and, for instance, closes a signal current circuit when the current intensity has reached a certain value. In addition to such peak measuring device there is also provided for the detector 5 a control device, by means of which whenever a line of the data carrier is exposed to the action, the pairs of conductor tracks 13 determining the successive columns $S_0 \ldots S_3$ are connected in series to the peak measuring device.

In FIG. 1 the line $Z_0$ of the data carrier 1 is exposed to the action. The line $Z_0$ possesses at the columns $S_0$ and $S_3$ a respective bridge element. Initially for the column $S_0$ both of the first conductor tracks 13 are connected with the detector 5. The illuminated photoresistor at the intersection or cross-over point $Z_0, S_0$ will possess a relatively low resistance, whereas the resistance of the non-illuminated photoresistors at the remaining intersection or cross-over points of the column $S_0$ will be high, so that the peak measuring device of detector 5 responds and the output signal will have a high signal value portraying the binary value 1. In the next step for the column $S_1$ the second and the third conductor tracks will be connected with the detector 5. No bridge element is present at the cross-over point $Z_0$, $S_1$ which is exposed to the influence or action. The bridge elements 14 provided at the remaining cross-over points of the column $S_1$ are not exposed to the action, the resistance of the photoresistors provided at such locations accordingly will be high, so that owing to the only weak current the peak measuring device will not respond. The output signal will then have a signal value portraying the binary value 0. The same conditions prevail at the column $S_2$. The column $S_3$ again contains an illuminated bridge element 14 and accordingly the output signal will possess the signal value 1. With the scanning or sampling of the line $Z_0$ there will be obtained a signal portraying the binary character combination 1001, which is delivered to an evaluation device 6.

The evaluation device 6 is constructed in accordance with the momentarily desired evaluation of the information detected from the data stored in the data carrier 1 and can be of conventional construction. It can be, for instance, a visual indicator device, a decoder circuit, a control device or, as indicated in FIG. 1, a printer which prints the binary characters 1 and 0 upon a paper band or tape. For the reader 2 there can be used as the evaluation device 6 any one of the known devices which process signals portraying binary data, wherein in any event there is to be provided a signal transformer between the detector 5 and the evaluation device, such signal transformer transforming the output signals of detector 5 for processing in the evaluation device 6. The feed mechanism or feeder 4, as a mechanical component, and as concerns its mode of operation and construction, is dependent upon the external configuration of the data carrier 1 and the momentary arrangement of the columns and lines which need not be absolutely lines located to intersect at right angles to one another. Such feeders or feed mechanism 4 are known or can be easily constructed without difficulties for special applications. The construction of the detector 5 is essentially determined by the nature of the momentarily selected bridge elements 14 of the data carrier 1, wherein the techniques usable with the different bridge elements for determining the bridge element-state with the action present and absent via the conductor tracks and for obtaining appropriate output signals constitute part of the general knowledge in the art. The same is also true as concerns the construction of the means 3 producing the momentarily desired influence or action. For each given special data carrier 1 there accordingly can be constructed the associated reader 2 without difficulties by any person skilled in this particular field of technology. It is for this reason that in the description to follow there will be primarily described exemplary embodiments of data carriers.

As the bridge elements for the data carriers there are of particular significance electrical components which, under the effect of an external influence or action, change their impedance or open or close a current path or deliver an electromagnetic force. Such components can be sensitive to pressure or tension, to magnetic fields, to electromagnetic radiation, especially in the infrared, visible or ultraviolet regions, to heat and so forth. In the case of electrical bridge elements the conductor tracks 13 are galvanic conductors which are appropriately applied as a function of the course of the columns of the data carrier to a carrier plate, preferably formed of electrically insulating plastic, for instance by means of a printing- or vaporization technique, or embedded in the form of wires in the carrier plate.

An exemplary embodiment of a data carrier 1 with electrical contacts as bridge elements is shown in FIGS. 2 and 3, and specifically roughly schematically illustrating in FIG. 2 a section through the data carrier along a line in the section A for the fixed data (FIG. 1), and FIG. 3 in the same illustration a section through the data carrier along a line in the section B for the flexible data. The data carrier possesses, for instance, a rectangular carrier plate 7 formed of electrically insulating plastic at which there are arranged in spaced relationship from one another the conductor tracks 13 consisting of narrow sheet metal copper strips. The contact-bridge elements are formed of resilient contact lamellae 12 which extend from below along the lines $Z_0 \ldots Z_8$ of FIG. 1 for a conductor track 13 and for the following conductor track from above into the intermediate spaces between the individual conductor tracks 13, so that at each intersection point of the columns and lines there is present one such contact-bridge element. For storing the fixed data in the section A at each cross-over point, at which the binary character 0 should be inscribed, the upper contact lamellae are removed, for instance pinched off, as such is apparent in FIG. 2 for the columns $S_2$ and $S_3$. The carrier plate 7 with the conductor tracks 13 and the contact lamellae 12 is covered with a cover plate 8 of electrically insulating plastic which possesses a bore at each cross-over point or intersection of the columns and lines. It is possible to actuate through the bores 9 the contact-bridge elements located therebelow. For actuating the contact-bridge elements there is provided a cam plate 10 at which there are provided at a flexible plastic foil first of all, for all cross-over points cams or dogs 11 which extend into the bores 9 of the cover plate 8. For inscribing the flexible data in the section B, as illustrated in FIG. 3 for the columns $S_1$ and $S_2$, the cams 11 are removed from the plastic foil at the cross-over points at which there should appear the binary character 0. The three plates 7, 8 and 10 are, for instance, bonded together and produce a data carrier in the form of a plastic card in which at one side there are only visible connection locations of the conductor tracks 13 for connection with detector 5. The means 3 (FIG. 1) of the reader 2 and producing the influence or action at the region of a line of the data carrier for this data carrier consist, for instance, of an upwardly and downwardly movable punch 31 extending over the line length and which carries at the lower lengthwise side for each column $S_0 \ldots S_3$ a punch cam 32, and a fixed counter support 33 at which bears the data carrier. When the punch 31 is placed on a line of a data carrier then all of the intact contact-bridge elements of the line are closed for which there is provided a cam 11 in the cam plate 10.

For such data carriers containing contact-bridge elements there are possible the most different constructions. The data carriers can be, for instance, constructed such that the intact contacts of the individual lines are closed at the region of each line by bending the data carrier. A data carrier which is to be mechanically loaded can contain, instead of the contact elements, also other known electrical components sensitive to pressure or tension. Thus, the bridge elements interconnecting the conductor tracks 13 for instance can consist of, an elastic, electrically conductive material (conductive rubber), the conductivity of which, upon being compressed together, becomes greater, the known strain gauge strips, piezoelectric transmitters and so forth. In the case of data carriers with relatively few lines the bridge elements also can be small capacitors in which the plate spacing can be changed for instance by pressure. For electrical components as bridge elements, as mentioned, the conductor tracks are galvanic conductors which are connected columnwise to the detector in that there is established either a direct galvanic connection of the conductor tracks with the input terminals of the detector, for which purpose, as previously already mentioned, at the data carrier the ends of the conductor tracks are freely exposed, or there is established a capacitive connection of the conductor tracks with the detector inputs. A capacitive connection has the advantage that is can occur through a cover sheet, so that the data carrier does not possess any freely exposed electrical contact connections or terminals, the contact terminals thus cannot be contaminated or damaged, and additionally at the data carrier there is not visible the number of conductor tracks (columns) it contains and where such are arranged. For a capacitive connection the conductor tracks 13 are chosen to be as wide as possible at the expense of the intermediate spaces located therebetween, in order that the connection of the conductor tracks of a data carrier with the detector, upon inserting a data carrier in the reader, is positively established and independent of possible positional errors. Additionally, wide conductor tracks with otherwise unchanged geometric data of the data carrier permit the realization of large coupling capacitances.

Although data carriers with mechanical, for instance, bridge elements activated by pressure, provide completely satisfactory results, their construction for fixed and flexible data still is rather complicated and their manufacture requires, especially in the case of data carriers with relatively many lines, a certain precision so that at each column, in which all of the bridge elements are connected in parallel, there is obtained a clear logic 1 signal by means of the bridge element activated by the influence or action.

The use of "field sensitive" components, i.e. electrical components, which are sensitive to a magnetic field, to electromagnetic radiation, especially in the shortwave infrared range of a wave length in the order of about 1 $\mu$m, and to heat, renders possible simply constructed and easy to fabricate data carriers.

FIG. 4 shows in cross-section a data carrier equipped with field-sensitive components as bridge elements and from which there will be apparent the principle construction.

Upon for instance a rectangular base plate 17 formed of electrically insulating material there are adhesively bonded, vapor deposited or printed conductor tracks 13 in the form of flat, strips of good electrical conductivity. At the lines between the conductor tracks 13 there are located the field sensitive bridge elements 14a, each of which interconnects two conductor tracks 13. Such field sensitive bridge elements can be constructed to be very flat in conventional manner. The application of the fixed data occurs by punching away or burning away the bridge elements, preferably automatically with special devices. The base plate 17 with the conductor tracks 13 and the bridge elements 14a is covered with a preferably non-transparent cover plate 18 which, at the region A for the fixed data of the data carrier, does not constitute any hinderance for the action, and in the section B for the flexible data of the data carrier is prepared such that the influence or action, i.e. that the field activating the bridge elements only can be effective in the region of that bridge element by means of which there is to be portrayed the binary character 1. To this end the cover plate 18 in the section B of the data carrier, as shown in FIG. 1, is covered with a layer or foil 15 screening the field and in which there are provided the windows 16 for the bridge elements to be activated. For an electrostatic screening there can be used, for instance, a cover plate 18 which does not screen the field and upon which at regions corresponding to the bridge elements there are printed or sprayed conductive layers. For the cover plate there also can be used a material which is rendered pervious or impervious to the field by means of a thermal treatment.

A data carrier with bridge elements which can be activated by electromagnetic radiation preferably contains as the bridge elements either photoresistors or photoelements which are sensitive for instance to short-wave infrared radiation and upon being irradiated possess an increased conductivity or deliver an electromagnetic force respectively. The cover 18 can consist of a dyed plastic which is non-transparent for the eye and pervious for the infrared radiation, and which in the section B for the flexible data is covered with a layer which is impervious to infrared radiation and possessing the windows or window means. Naturally, there also can be used photoresistors or photoelements which are sensitive to the visible and/or the ultraviolet spectrum range, but in this case then it is more difficult to obtain a cover plate which is non-transparent for the eye. For the cover plate there also can be used polarized materials, wherein, for instance, in a cover which is pervious for polarized radiation there are formed windows which do not permit passage of the radiation. The means 3 generating the influence or action and provided in the reader 2 consist of a light source which illuminates a region corresponding to a line of the data carrier. The light source can be designed for delivering alternating or chopped light of sufficiently high frequency, so that there is possible, apart from a galvanic, also a capacitive coupling of the data carrier-conductor tracks 13 with the detector 5. With photoresistors as bridge elements the detector 5 is designed for applying a voltage to the conductor tracks 13 and in the case of photoelements for measuring the photovoltage, i.e. for taking up a voltage.

In the case of an embodiment of data carrier sensitive to a magnetic field the bridge elements 14a (FIG. 4) consist of a material with pronounced Hall effect. The bridge elements 14a are oriented such that without the influence of a magnetic field they have a high resistance and under the influence of a magnetic field a lower resistance. For generating the magnetic field the reader 2 advantageously contains a strong magnet, the ledge-shaped constructed pole shoes of which enclose the data carrier. The section B for the flexible data of the data carrier consists of a soft magnetic foil in which there are punched holes as windows. To increase the effectiveness there are advantageously applied to both sides of the data carrier one such foil.

Another embodiment of data carrier sensitive to a magnetic field contains as the bridge elements inductances 14b (FIG. 5), which can be vapor deposited or printed according to known techniques upon the carrier plate 17 at the intersection points or locations of the columns and lines. At the intersection points determined by the data the inductances 14b are supplemented by a magnetic element 14c in the form of a highly permeable foil. For the foil there is used a material, the permeability of which changes quite markedly under the action of an external magnetic field. In the case of bridge elements at which there acts or does not act respectively, a sufficiently strong magnetic field, the permeability of the magnetic foil is of different strength or intensity and thus also its inductive resistance of different magnitude. The measurement of the resistance between two neighboring conductor tracks 13 occurs in this case by means of an alternating-current of appropriately high frequency.

In order to obtain data carriers which are sensitive to an electric field there are used as the bridge elements 14a (FIG. 4) semiconductors of the type wherein under the action of an electric field their conductivity strongly changes. Such known semiconductor devices are, for instance, field-effect transistors and field-sensitive diodes. The electric field required for this purpose is advantageously produced by two electrodes engaging about the data carrier. The section B of the data carrier containing the flexible data possesses an electrical screen which, for instance, can be applied via a capacitive connection to the ground potential of the reader. The field-sensitive semiconductor devices are generally current rectifier or converter elements, so that with the columnwise sampling of a line from column to column the applied voltage must be reversed in polarity.

Also different exemplary embodiments are possible for data carriers sensitive to heat. Simple heat-sensitive data carriers, with the construction shown in FIG. 4, contain as the bridge elements 14a, for instance temperature-sensitive resistors, such as thermistors, the conductivity of which becomes greater with increasing temperature. To activate the bridge elements there is advantageously employed an infrared radiation device.

Another embodiment of a heat-sensitive data carrier contains as the bridge elements thermoelements. An advantageous embodiment of such data carrier has been schematically shown in plan view in FIG. 6. Conductor tracks 13 are applied to an electrically insulating base plate 17, the conductor tracks consisting of the materials used for the thermoelement 14d, and specifically the uneven conductor tracks of the one material and the even conductor tracks of the other material. In order to form the thermoelements 14d the conductor tracks are provided at each cross-over point with overlapping tongues 13a which for instance are welded. With such construction there is insured that the cold soldered locations of a thermoelement which, for instance, is momentarily heated by infrared radiation is at lower temperatures. As mentioned, there is advantageously used for the activation of the bridge elements an infrared radiation device and the covering in the section B for the flexible data of the data carrier possesses regions which are pervious and impervious to infrared radiation.

A further embodiment of a heat-sensitive data carrier contains as the bridge elements temperature sensitive resistors 14f (FIG. 7), for instance thermistors, which are encased by a dielectric 14e which heats-up rather intensely in a high-frequency radiation field. The high-frequency radiation field is produced by two electrodes enclosing the data carrier at the region of a line. The screening in the section for the flexible data of the data carrier consists of a foil with windows and screens the high-frequency radiation field. Instead of such encased or sheathed resistance elements there also can be employed temperature-dependent resistors which directly heat-up in the high-frequency radiation field, for instance film resistors with a material component which heats up in the high-frequency radiation field.

Previously there were only described a number of exemplary embodiments of data carriers. A number of other physical effects can be utilized for the construction of the bridge elements 14, the activation field and the screening. The selection of the practical usable technique is therefore undertaken more in accordance from the standpoint of the economies. In this regard there are to be preferred techniques which permit the base plate of the data carrier, in a continuous fabrication process, to be provided with the conductor tracks and the bridge elements, for instance by vapor deposition or printing. It is advantageous for the fabrication of data carriers with bridge elements sensitive to an external field, especially such which change their conductivity or which under the action of an external field change their delivered electromagnetic force, not to provide at the cross-over points of the columns and lines individual bridge elements rather, as shown in FIG. 8, to connect the conductor tracks 13 of the individual columns $S_0 \ldots S_8$ with continuous bridges $14g$ which change their properties under the action of an external field exactly as the individual bridge elements. For applying the information there is for instance punched-out at the cross-over points or intersections of the lines and columns regions $54a$, $54b$ of the continuous bridges $14g$, so that at the corresponding locations the connection of the conductor tracks 13 is interrupted. As long as no information is applied, then with an applied external field there results a constant signal which does not change upon forward feed or advance of the data carrier. In the cycle column $S_0$ of FIG. 8 there is punched out at each intersection point of such column and the lines $Z_0 \ldots Z_6$ a region $54a$ of the continuous bridge $14g$. In the remaining columns, of which in FIG. 8 only the column $S_8$ has been shown, the applied information is appropriately punched-out at certain intersection points of the columns and lines at regions $54b$ of the continuous bridges $14g$, wherein the regions $54b$ are advantageously somewhat larger in their lengthwise expansion or extent than the regions $54a$ of the cycle column. Upon displacement of a data carrier 1 transverse to the region of a line encompassed by an external field, there is obtained a signal at the conductor tracks 13 of the clock column $S_0$ which periodically fluctuates with the individual lines, whereas the signal obtained from the conductor tracks of the information column $S_8$ does not change at the paths between the punched-out regions $54b$, for example between lines $Z_2$ and $Z_5$. Advantageously, under the influence of a signal from the conductor tracks of the clock column, there is checked, for instance the conductivity or the electromagnetic force between the conductor tracks of the information columns. With such checking at the column $S_8$ of FIG. 8 in the lines $Z_1$, $Z_2$ and $Z_5$ there is no change in the conductivity or electromagnetic force owing to the there present punched-out portions, on the other hand in the lines $Z_0$, $Z_3$, $Z_4$, $Z_6$, in which no punching operation was carried out, there can be detected a change.

As already mentioned a capacitive coupling of the conductor tracks with the detector 5 is more advantageous than a galvanic coupling. With all embodiments where such is possible, therefore there is used as the measurement voltage, which is applied by the detector 5 at two neighboring conductor tracks 13, an alternating-current voltage and as the activating field an alternating-current field respectively.

It can be readily recognized that a data carrier does not absolutely possess identical bridge elements and for the bridge elements, for the activation, there must be provided a single predetermined field. Different combinations are readily possible. Thus, for instance, in the case of a data carrier individual bridge elements or the bridge elements of individual lines can possess a clearly different sensitivity to the action of the prescribed activating field, so that the activated bridge elements deliver voltages of different amplitudes or possess different resistance values which can be detected or recognized by the detector 5. The data carrier can also however contain different types of bridge elements which are activated by one and the same field, such as for instance in a column photoresistors and in another column photoelements. Finally, there also can be used different activation fields which are used for the individual lines simultaneously or in succession. In the most cases of such combinations there is required for the detector 5 a synchronous switch-over which, however, can be readily carried out with the knowledge available at the present time.

As a further exemplary embodiment reference is made to FIG. 9 which schematically shows in plan view a data carrier for a pneumatic data processing device. The conductor tracks $13b$ of the data carrier are constructed in the form of relatively wide tubes and the bridge elements $14h$ possess very narrow tubes of high throughpass resistance. The tube system is filled with a magnetic or electric thixotropic liquid 19, the viscosity or tenacity of which changes markedly under the influence of a magnetic field or electric field. Instead of this there can be used also a liquid whose viscosity changes very markedly with temperature. For the application of the fixed date the bridge element tubes at the relevant cross-over points of the columns and lines are continuously squeezed together by a mechanical action. The activation of the bridge elements occurs by means of a magnetic or electric field or for instance by infrared radiation, depending upon the employed liquid, and the screening in the section for the flexible data of the data carrier is accordingly constructed. For the columnwise sampling of the bridge elements there is satisfactory a slight shifting of the liquid, which is generated by the detector and evaluated. In order that no liquid exchange occurs between the detector and the data carrier the conductor track tubes $13b$ are closed by membranes 20.

FIG. 10 illustrates a block circuit diagram of an advantageous construction of a detector device 5 of an apparatus with electrically scanned bridge elements in the data carrier.

The detector device 5 contains sampling or scanning conductors 21 which are connected with the individual conductor tracks 13 of the data carrier 1 inserted into the reader. The scanning conductors, with the exception of the first conductor $21a$, lead to a program switch 22. The program switch 22 contains for each connected scanning conductor 21 an electronic reversing switch 23 and for the reversing switch 23 a control device which carries out an automatic program by means of the control pulses delivered to its clock input 24. Whereas the pairs of conductor tracks 13 of the data carrier 1 which portray in rapid sequence in each case the successive columns $S_1 \ldots S_n$ are connected via the corresponding scanning lines or conductors 21 to the collector lines 25 and thus to the measuring unit 27. The control device is of known construction and therefore not particularly shown in FIG. 10. Depending upon whether in the line of the data carrier exposed to the action at the cross-over points of the line with the columns there is or is not present a bridge element activated by the action, then the measuring device 27 delivers at its output the logic signal 1 or 0. This signal value is stored via the distributor switch 29 in the storage 30 which is constructed as a matrix storage and of conventional design.

The first scanning conductor 21a is connected to the one input of a clock generator 26, the other input of which is coupled with the second scanning conductor. The column $S_0$ determined by the corresponding conductor track 13 of the data carrier 1 constitutes the clock column and at all of its intersection or cross-over points with lines there is arranged a respective bridge element 14 (FIG. 1) activatable by the influence or action and delivering the control pulses for the clock generator. As the clock column there also can be used any other random column of the data carrier. The output of the clock generator 26 is connected with the clock input 24 of the program switch 22.

The clock pulses delivered by the clock generator 26 for the purpose of further switching the reversing switch 23 of the program switch 24 are also delivered to the distributor switch 29, which controlled by the clock pulses insures for a correct distribution of the binary signal values obtained from the measuring device 27 at the storage places of the matrix storage 30. The information prevailing in the storage 30 are available via their output 35 for further processing by the evaluation device 6 (FIG. 1) of the reader 2.

The synchronism brought about in this way between the forward indexing of the distributor switch 29 and the relative movement of the data carrier to the means 3 producing the influence or action has, in contrast to other methods, such as for instance the monitoring of the movement of the data carrier by mechanical-electrical measurement value transformers and control of the clock generator by the measurement value transformer, the advantage that the synchronization is independent of the position tolerances of the lines of the data carrier with regard to its front edge and rear edge and thus there is rendered possible producing many data carriers in the form of a coherent band and then to cut the band into individual data carriers without thereby endangering the positive reading of the applied data.

A reader for such data carrier advantageously contains a device which prevents that data carriers which are not intended to be accepted by the relevant reader, i.e. in the case of externally similar appearance of the data carriers which are not intended for the reader rejects the same, in order to avoid erroneous measurements and to detect falsifications. To that end the first line detected by the reader is uniformly coded with bridge elements for all data carriers belonging to the relevant reader. The first line therefore does not carry any individual information for the later display or indication, rather a group feature which is approximately comparable to the characterization of the "type of card" in the perforated card technology. Upon the introduction of the data carrier into the reader the distributor switch assumes the position shown in FIG. 10, in other words does not apply the signal values obtained from the measurement device 27 to the input of the storage 30, rather to the input 36 of a code checker 37. This code checker or tester 37 contains, for instance, a storage for a line of binary data of the data carrier. The binary data applied into the storage is compared with the fixed binary data in the code checker and upon coincidence there is triggered, for instance, a signal which acts via the output line 38 of the code checker upon electromagnetic devices of the reader, such as for instance a blocking device preventing the introduction of the data carrier or a motor automatically introducing the data carrier. Such code testers or checkers are well known in the art. The code checker also can be designed such that it is capable of reading different checking codes according to the nature of a general code data carrier. The code checker 37 also can be employed for the purpose of influencing electromechanical units of the reader and via such to bring about, for instance, a repetition of the reading operation, to fixedly hold the data carrier in the reader until it can again be removed by a manual action, to trigger a signal and so forth.

A reader device for data carriers, which preferably serve as identification cards, has been schematically shown in FIG. 11 in sectional view. The reader should be designed for a data carrier which, for instance, contains in its first line, the recognition line, by bending the data carrier activatable bridge elements and otherwise as bridge elements Hall probes which can be activated by a magnetic field.

The housing 39 of the reader possesses an introduction slot 40 by means of which the data carrier can be introduced into the reader. The manual infeed of the data carrier is continued for such length of time until the data carrier finds a stop in the slot of an entrainment means 41. This entrainment means or entrainment member 41 is laterally guided in guides which have not been here shown and secured to two conveyor bands 42 which are driven by a motor 44 via the drive roll 43. The conveyor bands are endless and extend at the front portion of the reader over a deflecting roller which has likewise not been shown but may be of conventional structure. After the introduction of a data carrier its conductor tracks 13 (FIG. 1) are located opposite an appropriate number of scanning or sampling electrodes 45 which are pressed by springs 46 against the data carrier. The scanning electrodes 45 are galvanically insulated from the conductor tracks 13 of a data carrier by means of its cover plate 18 (FIG. 4). The conductor tracks 13 are therefore capacitively coupled with the program switch 22 (FIG. 10), which is installed with the other components of the detector device in the lower compartment 47 of the reader.

The slot of the entrainment member 41 is slightly inclined towards the conveyor band. In this way there is insured for a positive entrainment of the data carrier, and, since the data carrier contains at its first line, as mentioned, bridge elements which can be actuated by bending the data carrier, hence upon the insertion of the data carrier there is simultaneously activated the first bridge element line and, as previously mentioned, checked by the code tester or checker (FIG. 10). The slight inclination of the entrainment slot additionally brings about a contact of the data carrier against the scanning electrodes 45.

In this insertion position the second line of the data carrier, which is equipped with Hall probes, is still outside of the region of the pole shoes 48 of a powerful permanent magnet which in this case represents the means producing the action, and the code checker 37 (FIG. 10) places into operation the motor 44 by means of a signal via its output line 38. By means of the conveyor band 42 driven by the motor 44 the entrainment member 41, with the inserted data carrier, is drawn in the direction of the arrow 49 into the reading. In so doing the second and the further lines of the data carrier successively arrive in the magnetic field between the poles shoes 48 so that via the bridge elements the clock track controls the clock generator 26 (FIG. 10) and the stored data is detected by the measuring unit 27. If the code of the first line is incorrect, then, for instance, from the code checker via a switch it is possible to reverse the rotational sense of the drive motor 44. Also after completion of the reading operation it is possible to reverse the rotational direction of the drive motor, for instance controlled via the distributor switch 29, so that the data carrier is automatically returned.

The space 50 of the reader in the case of portable units serves to house a battery which can be recharged by a plug arranged in such space 51. In this space or compartment 51 there can also be provided a plug which permits connecting a printing device for plotting the data stored in the data carrier. The upper space or compartment 52 in the reader, and which space 52 is closed towards the outside by a window 53, contains an indicator device for the indication of the read data.

While there is shown and described present preferred embodiments of the invention, it is to be distinctly understood that the invention is not limited thereto, but may be otherwise variously embodied and practiced within the scope of the following claims.

Accordingly,

What is claimed is:

1. An apparatus for the storage and reading of data combined from binary characters, comprising a data carrier serving as a storage, said data carrier having columns and lines, means provided at intersection points of the columns and lines for portraying the binary characters in the form of binary signals, a reader for the data carrier which serves to generate binary signals portraying the stored data by means of a line-by-line scanning of the data carrier and evaluation of the binary signals, the improvement comprising: said data carrier having adjacently arranged separate signal conductor tracks incorporating intermediate spaces extending along the columns and separating the conductor tracks, bridge elements provided for the data carrier for the one binary character in the intermediate spaces between the conductor tracks at predetermined intersection points of the columns and lines, said bridge elements interconnecting at the predetermined intersection points both of the conductor tracks of a relevant column with one another, said bridge elements being reversibly activatable from a first condition which can be detected via the conductor tracks of the columns through an external action into a second condition portraying a binary character and detectable via the conductor tracks, and for the other binary character the conductor tracks at other intersection points of the columns and lines are selectively either not interconnected with one another or interconnected by such bridge elements, and means for rendering ineffectual from the outside the action at such other bridge elements for retaining the same permanently in the first condition portraying this other binary character, and wherein the reader incorporates means for generating the action in a region corresponding to a line of the data carrier, a feed mechanism for moving relative to one another the data carrier and the means generating the action in order to bring about a line-by-line scanning of the data carrier, an evaluation device, a detector operatively connected with the evaluation device for producing output signals for the evaluation device for determining the state of the bridge elements of the data carrier via its conductor tracks, said detector including a control device for the columnwise connection of pairs of conductor tracks determining the individual columns, said detector being designed such that its output signals in the case of bridge elements activated by the external action and connected therewith via a pair of conductor tracks possesses a first signal value portraying one binary character and otherwise a second signal value portraying the other binary character.

2. The apparatus as defined in claim 1, wherein the data carrier is a card.

3. The apparatus as defined in claim 1, wherein the data carrier contains a section encompassing one or more lines for the application of fixed data and a further section encompassing one or more lines for the application of flexible data, and wherein in both sections for the portrayal of the one binary character there is a bridge element activatable by the external action and for the portrayal of the other binary character in the first section for the fixed data there is used an intentionally destroyed bridge element or no bridge element and in the other section for the flexible data a bridge element provided with means rendering ineffectual the action.

4. The apparatus as defined in claim 3, wherein the data carrier in the other section for the flexible data at all intersection points of the columns and lines contains a respective bridge element which can be activatable by the external action, and said means rendering ineffectual from the outside the action being exchangeable.

5. The apparatus as defined in claim 4, wherein the data carrier is provided with a non-transparent cover layer which covers the conductor tracks, the bridge elements and the means rendering ineffectual the external action, but does not essentially impair such external action.

6. The apparatus as defined in claim 1, wherein the bridge elements are electrical components which close under the external action a current path and selectively change its resistance or conductivity or produce an electromagnetic force, and that the conductor tracks are galvanic conductor means which are insensitive to the action.

7. The apparatus as defined in claim 6, wherein the bridge elements comprise electrical components which are selectively sensitive to a mechanical action transmitted via the data carrier, to pressure or tension, and the means producing the action of the reader serve for exerting the mechanical action at the region of a line of the data carrier.

8. The apparatus as defined in claim 7, wherein there are used as the bridge elements of the data carrier contact pairs which can be closed under the influence of the external action.

9. The apparatus as defined in claim 7, wherein there are used as the bridge elements of the data carrier electrical resistance elements the resistance of which changes due to the action.

10. The apparatus as defined in claim 7, wherein there are employed as the bridge elements of the data carrier capacitors whose capacitance changes under the mechanical action.

11. The apparatus as defined in claim 5, wherein the bridge elements are photoelectric components in the form of photoresistors or photoelements, and the means of the reader for generating the action are constructed to illuminate a region corresponding to a line of the data carrier, and the means rendering the action ineffectual comprises a light impervious layer.

12. The apparatus as defined in claim 5, wherein the bridge elements are heat-sensitive electrical components, and wherein the means of the reader generating the action serve to heat a region corresponding to at least the bridge elements in a line, and the means rendering ineffectual the action are heat shields.

13. The apparatus as defined in claim 12, wherein the bridge elements are thermistors.

14. The apparatus as defined in claim 12, wherein the bridge elements are temperature-sensitive resistors and each resistor is enclosed by a material which heats up in a high-frequency electrical field, and further wherein the means of the reader for generating the action comprises a high-frequency generator and electrodes for limiting the radiation field to a region corresponding to a line of the data carrier.

15. The apparatus as defined in claim 12, wherein there are employed as the bridge elements temperature-sensitive resistors composed of a material that can be heated by inductive heating, and the means of the reader generating the action serve for the inductive heating of a region corresponding to a line of the data carrier.

16. The apparatus as defined in claim 12, wherein the bridge elements are thermoelements.

17. The apparatus as defined in claim 16, wherein the conductor tracks of the data carrier in the columnwise sequence alternately consist of one thermometal and another thermometal, and the thermoelements consist of welded together ends of transverse tongues of the conductor tracks.

18. The apparatus as defined in claim 5, wherein the bridge elements comprise semiconductor devices sensitive to an electrical field, said semiconductor devices serving to cause the means of the reader generating the action to produce an electrical field in a region corresponding to a line of the data carrier, and the means rendering ineffectual the action comprise electrical conductive layer means.

19. The apparatus as defined in claim 5, wherein said bridge elements are electrical components sensitive to a magnetic field and which serve to cause the means of the reader producing the action to generate a magnetic field, and wherein the means rendering ineffectual the action comprises magnetic screening means.

20. The apparatus as defined in claim 19, wherein said bridge elements comprise Hall elements.

21. The apparatus as defined in claim 19, wherein the bridge elements comprise alternating-current resistors constituted by inductances with magnetic core means composed of a material, the permeability of which is dependent upon the intensity of a magnetic field.

22. The apparatus as defined in claim 6, wherein the bridge elements of the data carrier comprise alternating-current resistors in the form of inductances with magnetic core means consisting of a material the magnetic properties of which change with temperature, and wherein the means of the reader generating the action serve for producing a temperature change in a region corresponding to a line of the data carrier.

23. The apparatus as defined in claim 1, wherein there are used as the bridge elements in the data carrier electrical components which with a corresponding external action and a corresponding construction of the detector deliver for the binary values direct-current or direct-current voltage signals, and for a galvanic coupling of the conductor tracks to the detector the data carrier possesses freely exposed portions of the conductor tracks.

24. The apparatus as defined in claim 1, wherein there are used as the bridge elements in the data carrier electrical components which with an appropriate action from the outside and an appropriate construction of the detector deliver for the binary values alternating-current or alternating-current voltage signals, and wherein the conductor tracks of the data carrier are completely covered with an insulating layer and the reader possesses electrodes by means of which there can be established a capacitive coupling of the conductor tracks of the data carrier with the detector.

25. The apparatus as defined in claim 1, wherein there are used electrical components as the bridge elements in the data carrier, the two states of which upon the influence of the external action and without such action can be detected via an alternating-current voltage, and that the detector is connected with the conductor tracks at the latter.

26. The apparatus as defined in claim 24, wherein the means for generating the action is designed to produce an action which changes in amplitude, frequency or phase, and as the bridge elements there are employed in the data carrier electrical components which permit a determination of their state by the alternately external action by means of the detector.

27. The apparatus as defined in claim 1, wherein the reader incorporates a clock generator which is controlled by signals delivered by a clock track of the bridge elements activated from the outside and wherein the connection of the conductor tracks of the data carrier with the detector as well as the evaluation device is controlled by the clock pulses of the clock generator.

28. The apparatus as defined in claim 27, wherein the reader comprises a code tester which checks the signals obtained from the bridge elements of the first line of the data carrier upon the presence of an external action.

29. The apparatus as defined in claim 1, wherein the data carrier contains bridge elements composed of different electrical components, and further wherein the means for producing the external action and the detector are constructed for the activation and reading respectively, of said different components.

* * * * *